Dec. 13, 1949     J. T. LUSIGNAN, JR     2,490,913
PIPE LINE VALVE

Filed Nov. 30, 1945     3 Sheets-Sheet 1

Inventor
JOSEPH T. LUSIGNAN JR.
By
Attorney

Dec. 13, 1949   J. T. LUSIGNAN, JR   2,490,913
PIPE LINE VALVE

Filed Nov. 30, 1945   3 Sheets-Sheet 2

Inventor
JOSEPH T. LUSIGNAN JR.

By

Attorney

Dec. 13, 1949     J. T. LUSIGNAN, JR     2,490,913
PIPE LINE VALVE

Filed Nov. 30, 1945     3 Sheets-Sheet 3

Inventor
JOSEPH T. LUSIGNAN JR.

By *[signature]*
Attorney

Patented Dec. 13, 1949

2,490,913

UNITED STATES PATENT OFFICE 2,490,913

PIPE-LINE VALVE

Joseph T. Lusignan, Jr., Mansfield, Ohio, assignor to The Ohio Brass Company, Mansfield, Ohio, a corporation of New Jersey Application November 30, 1945, Serial No. 631,877

13 Claims. (Cl. 137—144)

My invention relates to fluid pressure systems and has special reference to means for controlling the flow of fluids through the pipes of the system. My invention is particularly adapted for use in pipe line systems for transmitting fluids under high pressures.

One object of my invention is to provide a valve of a type in which the piston reciprocates to its open and closed positions to permit or to check the flow of a fluid, gas or liquid, through the system.

Another object is to prevent or materially reduce the excessive wear on certain parts of the valve due to the cutting action of the fluid, especially as the valve begins to open under high pressure of the fluid.

Still another object of my invention is to provide auxiliary means associated with the reciprocating piston to materially check the flow of fluid through the valve during the initial opening of the valve.

Still another object of my invention is to provide means to automatically control the movement of the auxiliary means relative to the longitudinal movements of the reciprocating piston.

Other objects of my invention will be disclosed as the description of my invention proceeds.

Figure 1:
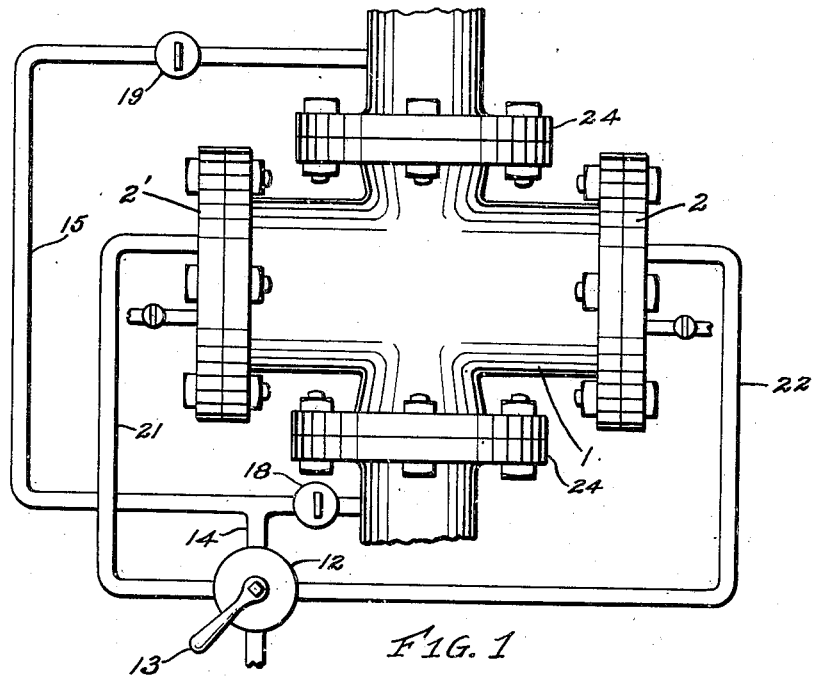
Fig. 1 is a top plan view of one embodiment of my invention shown as interposed in a pipe line and including operating and control means for opening and closing the valve.
Figure 2:
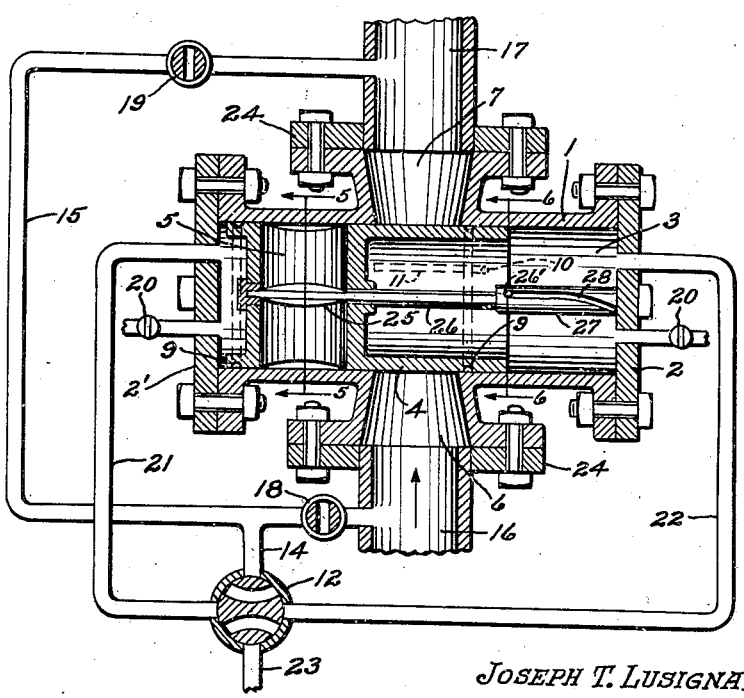
Fig. 2 is a longitudinal view in partial section of one embodiment of my invention shown in Fig. 1 and in closed condition; manually operable control means is schematically shown for operating the valve to its open or its closed positions; the control means is shown as preventing the admission of fluid pressure to the valve to operate the same.
Figure 5:
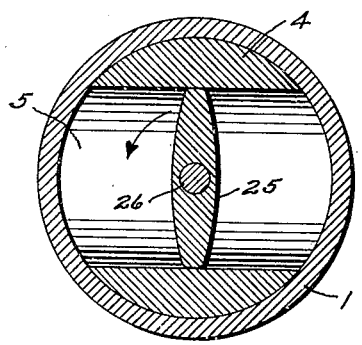
Figure 6:
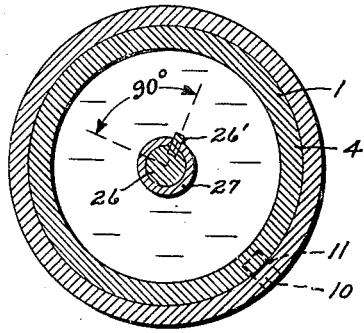

Figs. 5 and 6 are sections taken on the lines 5 and 6 respectively of Fig. 2.

Figure 4:
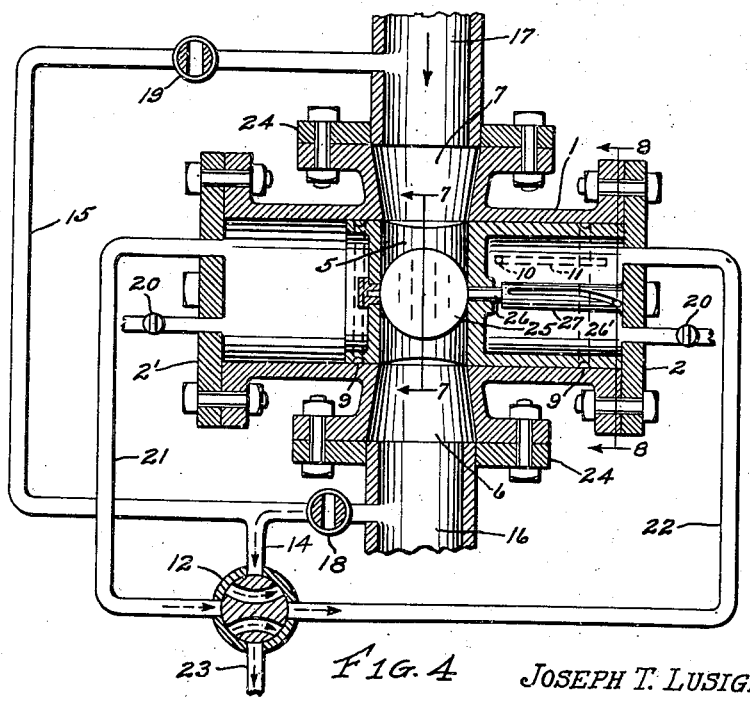
Fig. 4 is a longitudinal view in partial section with the piston in its full open position and the valve fully open; the manually operable and schematically shown control means is shown as preventing the admission of fluid pressure to the valve as the valve is fully open. The control means need not be closed but may be left open if desired as later explained.
Figure 7:
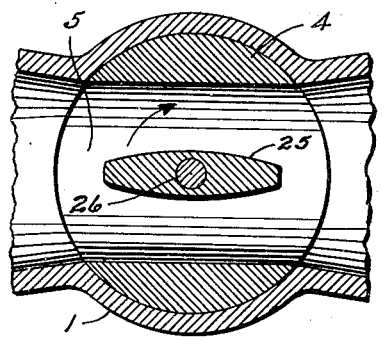
Figure 8:
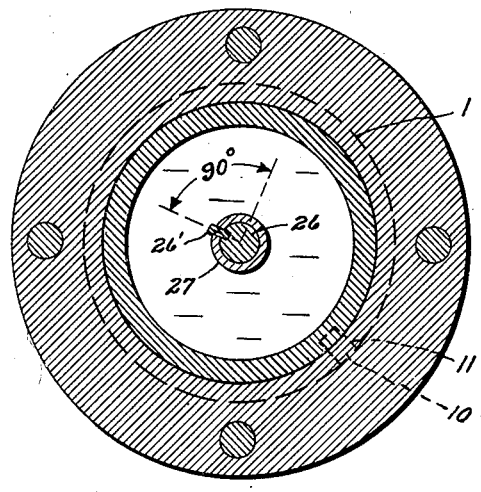

Figs. 7 and 8 are sections taken on the lines 7 and 8 respectively of Fig. 4.

Figure 9:
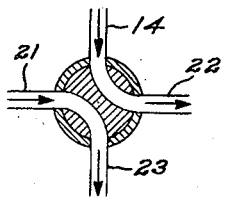

Fig. 9 is a schematic view of the direction control valve set for moving the piston to its closed position.

Figure 10:
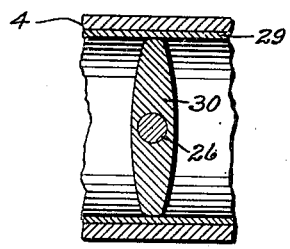

Fig. 10 is a sectional view of a modification of the piston and auxiliary valve as later explained.

Experience has shown that when valves of the reciprocating piston type are used to control the flow of fluids such as oils or other fluids which may contain abrasive materials such as grit or sand that the wear on the piston and valve body may be excessive.

This is particularly true when there is no pressure or practically none on the outlet side of the valve as the piston is moved to its open position. This wear is greatest on the valve body over an area adjacent the point $x$ (Fig. 3) on the outlet side of the valve and is the result of the high velocity of the fluid and the impact of the abrasive particles against such area.

This wear is found to take place principally at and during the initial opening of the valve. After the piston has moved to a position where the valve is substantially open or pressure builds up in the outlet side of the valve this wear is greatly reduced or practically nil.

As pointed out this wear is particularly severe on the body portion of the valve to which the pipe line is attached therefore I provide means which protect the body portion from this wear, and any wear which then takes place is in connection with the piston which is much more easily and economically replaced or repaired.

This means comprises a butterfly type of valve rotatable in the port of the piston. When the butterfly valve is slightly open a throttling action occurs within the port of the piston thus transferring the wear from the body to the wall of the piston port and edge of the butterfly valve. When the fluids are free of abrasive particles this wear is quite inconsequential for a long period of time.

This wear on the piston-port wall and edge of the butterfly valve may be greatly reduced and in many cases eliminated by inserting a replaceable lining in the piston-port and providing the butterfly valve with a cover, in whole or part, of wear resisting material.

If the opening of the butterfly valve is delayed for a time to permit a partial opening of the piston-port the wear upon the body will be substantially eliminated, therefore I provide means to automatically open the butterfly valve after the piston has moved to its open position a predetermined amount.

The preferred embodiment of my invention comprises the body 1 which may be of any dimensions to meet requirements. The body is closed at the ends by the head members 2 and 2', which are secured in place by bolts and nuts. The body is provided with a cylindrical bore 3 in which is mounted a reciprocating member or piston 4 provided with a port or through opening 5, preferably round in cross-section, and which registers with the inlet opening 6 and the outlet opening 7, also preferably round in cross-section, in the valve body 1. In Fig. 2, the valve is shown closed and in Fig. 4 the valve is shown as open. The said sections may be square.

The piston 4 is provided with circumferential grooves in which may be placed rubber, leather or metal packing rings or other suitable packing 9. With properly close fit between body 1 and piston 4 the packing 9 may be omitted and grease grooves alone may be employed as well known in the art.

The reciprocating piston is prevented from rotating by a dowel 10 which is fixed to and projects through the body and into the longitudinal groove 11.

Figure 3:
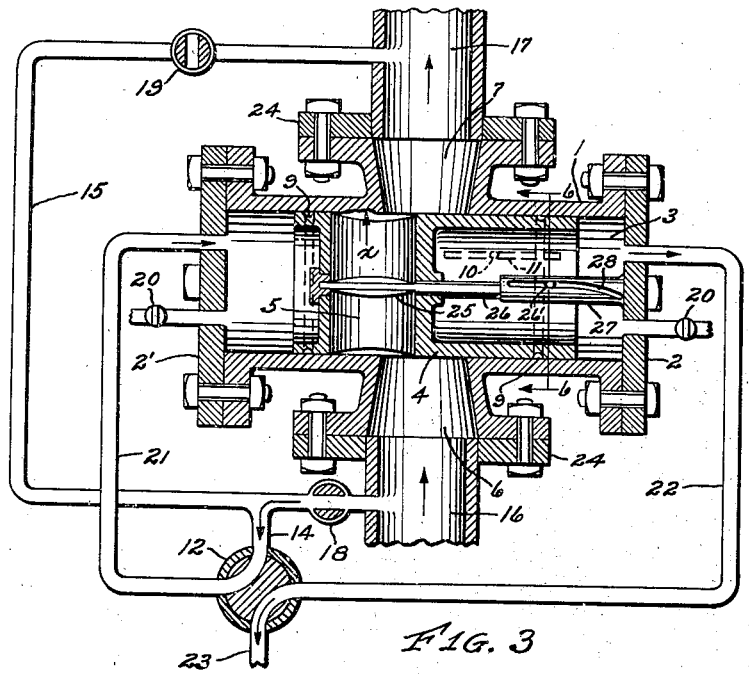
Fig. 3 is a view similar to Fig. 2 in partial section except the piston is shown as having made a partial opening but the valve is still closed as later explained; the manually operable control means is schematically shown as admitting fluid pressure to the valve to move the piston to its fully open position.

As I am not claiming the construction of the control valve 12, I have shown schematically herein a specified form of control valve which is of the rotary type and is operable manually to the three positions as shown schematically in Figs. 2, 3 and 9.

The control valve 12 may be placed anywhere convenient, either adjacent to or remote from the valve 1 and under proper manual operation by the handle 13 to admit fluid pressure to either end of the valve 1 and at the same time exhaust air from the other end of valve 1 to atmosphere.

In Fig. 3, the control valve is shown as admitting fluid pressure from the supply pipe 16 to the cylinder, thus moving the piston to its open position. In Fig. 4, if the control valve D is set as in Fig. 9 and the valve 18 opened, the fluid pressure would be permitted to flow to the other end of the cylinder as shown by dotted lines in the piping and would move the piston to its closed position.

In connecting valve 1 into a pipe line, I prefer to install a by-pass pipe 15 around valve 1 connecting the main pipes 16 and 17. I introduce into the by-pass pipe two valves 18 and 19 and connect the by-pass pipe to the control valve 12 as shown in Figs. 1 to 4 inclusive. By this arrangement I am able to utilize fluid pressure from either pipe 16 or 17 by proper manipulation of the valves 18 or 19.

Should pressure fail entirely on both sides of the main valve 1 so that operation of valve 1 from either pipe 16 or 17 is impossible, I have provided a pipe and valve 20 at each end of the valve body communicating with the interior of the valve body and by means of which pressure may be introduced into the valve body by means of a hand operated air pressure pump or other convenient means.

In the arrangement shown in Fig. 2 the piston is in extreme closed position and the valve closed and the by-pass valves closed and the control valve is in its neutral position.

In Fig. 3 the control valve 12 is set for moving the piston and the by-pass valve 18 opened, thereby permitting fluid pressure to flow from the pipe 16 into the pipe 14 and 21 to one end of the cylinder as shown by the arrows, and the air in the other end of the cylinder will flow through the pipes 22 and 23 to atmosphere as shown by the arrows. This will move the piston from the position shown in Fig. 2 to that shown in Fig. 4 in which the valve is fully open for the flow of fluid pressure from line pipe 16 into line pipe 17. In this position the by-pass valve 18 may be closed and the control valve 12 moved to its neutral position as in Fig. 4.

If it is now desired to close the main valve, the control valve 12 will be set as in Fig. 9 and the valve 18 opened thus putting fluid pressure into the right hand end of the cylinder through pipe 14 and 22 and exhausting air from the other end of the cylinder to the atmosphere through pipes 21 and 23 to move the piston to its closed position after which the by-pass and control valves may be set as in Fig. 2.

If desired to operate the valve 1 by means of fluid pressure from line pipe 17, then the valve 19 is opened and the valve 18 closed.

The normal position of the main valve 1 is with the longitudinal axis of the piston in a horizontal position.

By fluid pressure I refer to such fluids under pressure as gas, air, water, oil, volatile liquids, etc.

The pipes 16 and 17 are shown attached to the valve body by means of flanges 24 but the connection may be made by direct threading or other means.

An important feature of my invention as previously stated is to provide means to prevent damage to the valve body by the action thereon of the fluids flowing through the valve as the valve starts to open with practically no pressure in the outlet line 17, especially when the pressure is high and the fluid carries abrasive particles.

If the fluids are free of abrasives, the valve parts may be made of the usual standard materials for such purpose namely, cast iron, cast steel and bronze.

To overcome the undesirable wear on the body 1 referred to above I provide in the opening 5 of the piston, means to prevent or substantially check the flow until the piston has moved a predetermined distance toward its fully open position.

To accomplish this improvement I introduce into the opening 5 a valve 25 of the butterfly type which is mounted on a shaft 26 to rotate therewith through 90 degrees. The operation of the valve 25 is automatic and relative to the longitudinal movement of the piston 4.

When the piston is in its closed position the valve 25 is set to close the opening 5 (Fig. 2) and when the piston is in its fully open position the valve 25 is in its fully open position (Fig. 4).

To effect movement of the butterfly valve 25 relative to the movement of the piston 4, there is secured to the head 2 a tube-like member 27 as by welding, threading or otherwise. The shaft 26 is telescopically mounted in the tube 27 to move relative thereto with the movement of the piston.

The tube 27 is provided with a slot 28 and the shaft 26 is provided with a guide pin 26' secured to the shaft and extending into the slot 28. The slot 28 is curved which causes the valve 25 to rotate when the piston reciprocates and the form of the slot determines the rate of movement of the valve 25 relative to the movement of the piston.

The curvature of the slot may be such as to start the valve 25 to open at any point during the movement of the piston in its opening direction. In Fig. 3 the piston is shown as about one-third open and the butterfly valve is still closed but a glance at the slot 28 will show that the slot starts to curve with respect to the pin 26', therefore the valve 25 will now begin to rotate to its open position. This allows the piston to be well past its "cracking" position before the flow of the fluid pressure begins.

As the valve 25 begins to open, and the fluid under pressure begins to flow, any cutting or abrasive action will take place in the wall of the opening 5 at the rim of the valve 25 and also on the edge of the valve 25. However this may be almost if not entirely overcome by placing a renewable lining 29 (Fig. 10) in the piston for the opening 5 made of a wear resisting material such as white or hard cast iron or some chrome alloy of steel and by making the valve 30 of the same material.

If the wear on the lining 29 or the valve 30 (Fig. 10) when made of wear resisting material should become excessive, they are quite easily replaced compared to that of replacing the entire valve or body member.

This lining 29 could be made of natural or synthetic rubber or other plastic not affected by the flowing material and the valve 25 could have a covering of the same material.

The construction and material used in the valve should be chosen with regard to the fluid to be controlled and the amount and nature of abrasive materials it may carry.

Many of the plastic materials such as rubber, etc. are resilient and the abrasive particles rebound from same without materially affecting it.

White or hard cast iron, chromium alloy steels, etc. resist wear due to their great hardness.

For use with fluids free from abrasive particles, valves of ordinary cast iron, cast steel, bronze, etc. will be entirely satisfactory when provided with the cam-like means to effect proper movement of the butterfly valve relative to that of the piston.

If desired the shaft 26 and tube 27 may be interchanged in which case the pin 26' will be stationary and the tube and slot will move with the piston, or other equivalent means to automatically rotate the valve 25 (or 30) may be used.

The piston 4 is so designed with respect to the length of the bore 3 that the piston will contact the end members 2 and 2' to act as stops when the passage 5 is properly positioned with respect to the ports 6 and 7.

Having the means to automatically rotate the valve 25 concealed within the body, a compact device is the result and the said means is free from injury but easy of access thereto by removal of head 2.

Modifications will suggest themselves to those skilled in the art from the disclosure I have herein made, and, therefore, I wish to be limited only by my claims.

I claim:

1. In a valve for fluid pressures comprising a cylinder having ports in the side wall thereof and a piston slidable in said cylinder and adapted to close said ports in one position of said piston and the piston having an opening therethrough for connecting said ports in another position of said piston and means for effecting movement of said piston to its two positions, the combination with said piston of an auxiliary valve positioned in said opening to maintain said opening closed until the piston has moved a predetermined distance toward its fully open position and means automatically effecting movement of said auxiliary valve to its open position as the piston moves beyond the said predetermined position and until it reaches its fully open position.

2. In a valve for a fluid pressure pipe line, comprising a cylinder having ports in the side wall thereof and a piston slidable in said cylinder for controlling the ports and adapted to close the ports in one position of said piston and the piston having means for connecting said ports in another position to permit the flow of a fluid therethrough and means for effecting movement of the said piston to the said two positions, the combination with the said piston of automatically controlled means to check the flow of fluid through the ports until the piston has uncovered the ports a predetermined amount and means to move the said automatically controlled means after the piston has uncovered the ports said predetermined amount to remove said check to the flow of fluids through the valve by the time the piston reaches its fully open position.

3. A valve for a fluid pressure pipe line comprising a body having a bore and ports in the side walls of the body, a reciprocating piston slidable in said bore and having means to close the ports when in one position and having other means to connect the ports when in its other position, still other means associated with the piston to maintain said valve closed until the piston has uncovered the ports a predetermined amount and means wholly within said bore to automatically move the last said means to effect a full opening of the valve by the time the piston reaches said other position.

4. A valve for a fluid pressure pipe line comprising a cylinder having ports in the side walls thereof, a piston slidable in the cylinder and adapted to close the ports in one position of the piston, the piston having an opening therethrough for connecting the ports in another position of the piston, means positioned in the opening and operable to two positions to control the opening through the piston and means to automatically control the movements of the last said means as the piston moves from either position to its other position.

5. A valve for a fluid pressure pipe line comprising a cylinder having ports in the side wall thereof, a piston slidably mounted in the cylinder and provided with an opening therethrough for controlling the opening and closing of the ports and means mounted in the opening and movable with the piston for controlling the opening and closing of the opening through the piston and other means to automatically operate the first means in synchronism with the movements of its piston as the piston moves back and forth in the cylinder.

6. A pipe line opening and closing valve comprising a body having a bore provided with an inlet and an outlet opening and means for attaching the adjacent ends of the pipe line to the inlet and to the outlet, a reciprocating piston valve in the bore movable across the openings, the piston in one position closing the openings and having a transverse passage adapted to connect the openings when the piston valve is in the other position, control means associated with the piston and positioned within the said passage to control the flow of fluid pressure through the passage, the control means closing the passage when the piston is in said one position and opening the passage when the piston is in the said other position, means to automatically move the control means from its closed position to its open position at a predetermined rate relative to the rate of movement of the piston and means connected to the ends of the bore whereby fluid under pressure from the pipe line may be applied to the bore to move the piston to either of its positions.

7. A pipe line opening and closing valve comprising a body having a bore provided with an inlet and an outlet opening and means for attaching the adjacent ends of the pipe line to the inlet and to the outlet, a reciprocating piston valve in the bore movable across the openings, the piston in one position closing the openings and having a transverse through passage adapted to connect the openings when the piston valve is in the other position, control means associated with the piston and positioned within the said passage to control the flow of fluid pressure through the passage, operating means associated with the control means to automatically effect a rotational movement thereof as the piston valve moves from one position to its other position and means connected to the ends of the bore whereby fluid under pressure from the pipe line may be applied to the bore to move the piston to either of its positions.

8. A pipe line opening and closing valve comprising a body having a bore provided with an inlet and an outlet opening and means for attaching the adjacent ends of the pipe line to the inlet and to the outlet, a reciprocating piston valve in the bore movable across the openings, the piston in one position closing the openings and having a transverse through passage adapted to connect the openings when the piston valve is in the other position, control means associated with the piston and positioned within the said passage to control the flow of fluid pressure through the passage, operating means associated with the control means to automatically effect a rotational movement thereof as the piston valve moves from one position to its other position, the operating means provided with means to effect a predetermined rate of rotation of the control means and means connected to the ends of the bore whereby fluid under pressure from the pipe line may be applied to the bore to move the piston to either of its positions.

9. A valve comprising a body having transversely disposed passages, closing means at the ends of one passage and means at each end of the other passage to attach pipes thereto, the said one passage constituting a bore with a non-rotatable longitudinally movable piston valve mounted in the bore and of less length than the bore, a transverse opening through the piston and arranged to fully register with the said other passage only when the piston is at one end of its stroke, the piston being arranged to close the said other passage when the piston is at the other end of its stroke, a rotatable valve positioned in the transverse opening in the piston, elongated means associated with one of the closing means, elongated means associated with the rotatable valve and telescopically associated with the first said elongated means and means on one elongated means cooperating with means on the other elongated means to automatically effect the rotation of the rotatable valve as the piston moves from end to end of the bore whereby the transverse opening will be fully open when the said opening fully registers with the aforesaid other passage.

10. A valve for a fluid pressure pipe line comprising a cylinder having ports in the side wall thereof, a non-rotatable piston slidable in said cylinder to two positions and adapted to close the ports in one position of the piston, the piston having a passage therethrough for connecting the ports in the other position of the piston, a rotatable auxiliary valve in the said passage to close the passage while the piston is in said one position and to open said passage while the piston is in said other position, means to rotate the valve and fixed means secured to the cylinder within the cylinder and cooperating with the first means to effect a rotation of the auxiliary valve to its open position from its closed position and vice versa.

11. A valve according to claim 10 characterized by the said cooperating means being so constructed and related that the movement of the auxiliary valve shall be other than uniform with the movement of the piston.

12. A valve for a pipe line comprising a body having a bore provided with inlet and outlet openings, a reciprocating non-rotatable piston valve in the bore movable across the openings, the piston in one position closing the openings and having a transverse passage adapted to connect the openings when the piston is in the other position, a rotatable valve positioned within the passage to open and close the passage and means associated with the rotatable valve, other means associated with the body and cooperating with the first means to move the rotatable valve to its two positions, one of the said means provided with a cam like means to control the rate of rotation of the rotatable means, and means to control the supply of fluid pressure to the ends of said bore to effect movement of the piston to either of its two positions.

13. A piston for a reciprocating type of valve body comprising an elongated cylindrical member having a transverse opening at one end of the member and the other end longitudinally recessed back to the wall of said opening, a butterfly valve positioned in the opening, rotatable means to which the butterfly valve is secured to mount the valve in said opening and to rotate with the rotatable means, the said rotatable means extending through the wall of the said opening and projecting into the said longitudinal recess and means on the rotatable means adapted to cooperate with fixed means within the valve body to effect rotation of the rotatable means whereby the opening in the piston may be automatically opened and closed as the piston moves back and forth in said valve body.

JOSEPH T. LUSIGNAN, Jr.

REFERENCES CITED

The following references are of record in the file of this patent:

UNITED STATES PATENTS

| Number | Name | Date |
|---|---|---|
| 623,873 | Borden | Apr. 25, 1899 |
| 904,852 | Dwyer | Nov. 24, 1908 |
| 1,193,780 | Hoag | Aug. 8, 1916 |
| 1,251,453 | Spencer | Dec. 25, 1917 |
| 1,780,160 | Leach | Nov. 4, 1930 |
| 2,059,687 | Gagg | Nov. 3, 1936 |
| 2,337,841 | Shafer | Dec. 28, 1943 |